UNITED STATES PATENT OFFICE.

ALBERT HAYES, OF NEW YORK, N. Y., ASSIGNOR TO CARNOT DEVELOPMENT CORPORATION, A CORPORATION OF NEW YORK.

SOLUTION FOR THE TREATMENT OF IRON OR STEEL.

1,241,113.     Specification of Letters Patent.     Patented Sept. 25, 1917.

No Drawing.     Application filed March 31, 1916. Serial No. 88,047.

*To all whom it may concern:*

Be it known that I, ALBERT HAYES, a citizen of the United States, residing at New York, in the county of New York, State of New York, have invented certain new and useful Improvements in Solutions for the Treatment of Iron or Steel, of which the following is a description.

My invention relates to a solution for the treatment of iron or steel for the purpose of imparting to it increased toughness or tensile strength.

It is well known that in the treatment of steel by heating and quenching in liquid the result produced is somewhat dependent on the character of the liquid in which the treated steel is quenched—for instance, if the treated steel is quenched in oil, the result is different from that produced by quenching it in water at the same heat. It has also been found that if certain chemicals are added to the water in which the heated steel is quenched, a different result is produced from that produced by quenching it in water not having such chemicals in solution. Various chemical solutions have been proposed and various results as regards improvement of the steel, particularly as regards toughness or tensile strength have been secured. It is the object of my present invention to produce a solution for the treatment of steel or iron by heating and quenching by the use of which, by a single operation, the toughness or tensile strength of the steel or iron will be greatly increased.

With these objects in view, my invention consists in the solution hereinafter described and claimed.

The characteristic element of the solution of my present invention is fluorin, but for the best results I use this in a solution containing also sal ammoniac, chlorid of sodium (common salt) and chlorin, and generate the fluorin in the solution from a fluorid. such as fluor spar, by the addition of hydrochloric acid.

In preparing the solution for the treatment of steel or iron, I dissolve three ounces of sal ammoniac and three ounces of common salt in a gallon of water and add to this one-twentieth of an ounce of fluorid such as powdered fluor spar, and then add about two per cent. of muriatic (hydrochloric) acid and cool the solution to about 150 degrees Fahrenheit and add as much chlorin in the form of gas or liquefied as the solution will take up. The solution is then ready for use.

In carrying out my process, I heat the steel or iron to be treated as it comes from the mill and without special hardening or annealing to a low red heat, say from 300 to 500 degrees Fahrenheit, being careful to see that it is heated throughout to the same temperature, and then I quench it in the solution. The result of quenching it in the solution is a rearrangement of the molecules and probably also a change in their composition throughout the mass of the metal so that the metal will present a fibrous appearance and can be broken only with great difficulty, its tensile strength being very greatly increased. By regulating the heat of the solution between, say 98 degrees and 200 degrees Fahrenheit, I am able by the single quenching to give steel a hard or soft temper, so that no reheating is necessary for annealing or hardening. Steel so treated may, however, be reheated for tempering without destroying the fibrous character imparted to it by quenching in the solution.

The solution used as above described affects the entire mass of the steel or iron subjected to its action, provided, of course, it is uniformly heated throughout its mass. If it is desired to have the metal made tough and fibrous only exteriorly leaving the interior crystalline, this result may be brought about by heating it until the exterior only is brought to a low red heat while the interior is less highly heated and then quenching it in the solution.

The fluorin set free by the action of the hydrochloric acid or by the chlorin or by the combined action of the acid and the chlorin on the fluorid used seems to have a permanent effect upon the silica present in the steel or iron either to dissolve it out or to change its character so as to leave the steel or iron free from brittleness. It is possible also that the fluorin may produce its effect by its action on the sulfur present in the steel or iron; and while it is clear that the fluorin is the important element of the solution, it seems to be clear that its action is modified and facilitated by the presence of the chlorin.

It will, of course, be understood that I do not desire to be limited to the precise proportions of the chemicals above stated as it is sufficient to use them in approximately the proportions stated without weighing.

I do not claim herein the process of treating steel or iron above described nor the product obtained by such treatment, as the process and product form the subject-matter of a separate application filed by me March 31, 1916, Serial No. 88,046.

Having thus described my invention, what I claim is:

1. A solution for the treatment of iron or steel containing hydrochloric acid, free chlorin and a substance capable of yielding fluorin.

2. A solution for the treatment of iron or steel containing chlorid of sodium, hydrochloric acid, free chlorin and a substance capable of yielding fluorin.

3. A solution for the treatment of iron or steel containing sal-ammoniac, chlorid of sodium, hydrochloric acid, free chlorin and a substance capable of yielding fluorin.

This specification signed and witnessed this 29th day of March, A. D. 1916.

ALBERT HAYES.